United States Patent
Webster

(10) Patent No.: US 9,709,156 B2
(45) Date of Patent: Jul. 18, 2017

(54) BEARING SHAFT

(71) Applicant: ROLLS-ROYCE plc, London (GB)

(72) Inventor: John R Webster, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 15/135,096

(22) Filed: Apr. 21, 2016

(65) Prior Publication Data

US 2016/0334006 A1 Nov. 17, 2016

(30) Foreign Application Priority Data

May 14, 2015 (GB) .................................. 1508231.6

(51) Int. Cl.
| | |
|---|---|
| *F16H 57/08* | (2006.01) |
| *F16C 17/02* | (2006.01) |
| *F16H 57/04* | (2010.01) |
| *F16C 3/02* | (2006.01) |
| *F16H 1/28* | (2006.01) |
| *F02C 7/36* | (2006.01) |

(52) U.S. Cl.
CPC ............... *F16H 57/08* (2013.01); *F16C 3/02* (2013.01); *F16C 17/02* (2013.01); *F16H 1/28* (2013.01); *F16H 57/0479* (2013.01); *F02C 7/36* (2013.01); *F05D 2260/40311* (2013.01); *F16C 2360/23* (2013.01); *F16C 2361/61* (2013.01); *F16H 2057/085* (2013.01)

(58) Field of Classification Search
None
See application file for complete search history.

(56) References Cited

U.S. PATENT DOCUMENTS

| | | | | |
|---|---|---|---|---|
| 4,668,107 A | * | 5/1987 | Showalter | F16C 9/02 384/114 |
| 4,772,137 A | * | 9/1988 | Salter, Jr. | B21B 31/074 384/118 |
| 4,930,910 A | * | 6/1990 | Mori | F16C 9/04 384/276 |
| 8,371,754 B2 | * | 2/2013 | Kuwabara | F16C 9/02 384/278 |
| 2003/0181246 A1 | | 9/2003 | Amborn | |

FOREIGN PATENT DOCUMENTS

| | | |
|---|---|---|
| DE | 102009017301 A1 | 8/2010 |
| DE | 102013221265 A1 | 5/2015 |
| EP | 0677669 A1 | 10/1995 |
| WO | 2009/051395 A1 | 4/2009 |

OTHER PUBLICATIONS

Nov. 10, 2015 Search Report issued in British Patent Application No. GB1508231.6.
Aug. 10, 2016 Search Report issued in European Patent Application No. 16 16 6119.

* cited by examiner

*Primary Examiner* — Dirk Wright
(74) *Attorney, Agent, or Firm* — Oliff PLC

(57) ABSTRACT

A hollow cylindrical rotary bearing shaft for a planet gear of an epicyclic gear train, has a cylindrical outer surface accommodating the planet gear, and a wall thickness. The wall thickness of the bearing shaft varies circumferentially around a diameter of the bearing shaft so as to produce a pre-determined circumferential variation in the wall thickness.

6 Claims, 3 Drawing Sheets

BEARING SHAFT

This disclosure claims the benefit of UK Patent Application No. 1508231.6, filed on 14 May 2015, which is hereby incorporated herein in its entirety.

FIELD OF THE DISCLOSURE

The present disclosure relates to a bearing shaft for a planet gear of an epicyclic gear train and particularly, but not exclusively, to a bearing shaft for a planet gear of an epicyclic gear train in a turbofan engine.

BACKGROUND TO THE DISCLOSURE

With reference to FIG. 1, a ducted fan gas turbine engine is generally indicated at 10 and has a principal and rotational axis X-X. The engine comprises, in axial flow series, an air intake 11, a propulsive fan 12, a power gearbox 13, an intermediate pressure compressor 14, a high-pressure compressor 15, combustion equipment 16, a high-pressure turbine 17, an intermediate pressure turbine 18, a low-pressure turbine 19 and a core engine exhaust nozzle 20. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first (main) air flow A into the intermediate pressure compressor 14 and a second (bypass) air flow B which passes through the bypass duct 22 to provide propulsive thrust. The intermediate pressure compressor 14 compresses the air flow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines respectively drive the high and intermediate pressure compressors 15, 15, and the fan 12 through the power gearbox 13, by suitable interconnecting shafts.

The power gearbox 13 enables the fan 12 to be operated at a lower rotational speed than the low pressure shaft and thus low pressure turbine 19. This enables the low pressure turbine 19 to operate at a higher rotational speed thus requiring fewer stages, and so increasing efficiency and reducing weight.

The rotational speed of the fan 12 allows higher bypass ratios, leading to reductions in both fuel consumption and generated noise. A large part of the noise reduction is due to the reduced fan tip speeds.

The high power requirement of the propulsive fan 12 and the packaging constraint leads to an epicyclic gear train that in turn has a large diameter which takes up valuable space in the engine core. The large gearbox diameter also results in significant centrifugal loading on gearbox components, particularly the planet gears.

One known technique for reducing the centrifugal loading on the planet gears is to reduce their axial width. However, reducing the axial width of the planet gear may lead to circumferential distortion, particularly where the planet gear teeth mesh with the sun and ring gear teeth. This circumferential distortion causes a change in the loading on the planet gear bearing, which in turn leads to higher bearing stress and reduced bearing life.

STATEMENTS OF DISCLOSURE

According to a first aspect of the present disclosure there is provided a hollow cylindrical rotary bearing shaft for a planet gear of an epicyclic gear train, the bearing shaft comprising:
 a cylindrical outer surface accommodating the planet gear; and
 a wall thickness,
wherein the wall thickness varies circumferentially around a diameter of the bearing shaft so as to produce a pre-determined circumferential variation in wall thickness.

By varying the wall thickness of the bearing shaft circumferentially around the circumference of the bearing shaft, the radial stiffness of the bearing shaft may be altered around the circumference of the shaft.

This circumferential variation in radial stiffness of the bearing shaft allows a planet gear that is accommodated on the shaft to deflect in correspondingly varying manner in response to an applied load resulting from the gear meshing with a sun gear and a ring gear.

Optionally, the pre-determined circumferential variation in wall thickness extends linearly along an axial length of the bearing shaft.

In one arrangement, the circumferential variation in wall thickness is constant along the axial length of the bearing shaft. In other words, the bearing shaft has the same cross sectional profile along its entire axial length.

In another arrangement, the cross sectional profile of the bearing shaft varies along the axial length of the shaft. In this way, the circumferential variation in wall thickness changes along the length of the shaft.

Optionally, the pre-determined circumferential variation in wall thickness is determined in dependence upon a circumferential variation in a radial loading experienced by the planet gear.

The radial loading resulting from the meshing engagement of the planet gear with each of the sun gear and the ring gear can be readily determined. This radial loading will cause a corresponding bearing stress in the planet gear bearing.

An increase in the radial deflection of the planet gear will therefore result in increased stresses in the planet gear bearing assemblies along with a corresponding reduction in their useful working life.

By matching the circumferential variation of the wall thickness of the bearing shaft to the circumferential variation in the radial loading experienced by the planet gear, it is possible to match the radial deflection of the bearing shaft at any circumferential point to the corresponding radial loading.

In other words, the circumferential variation in the wall thickness at any circumferential point is such that the radial deflection of the bearing shaft increases with an increase in the radial loading, and decreases with a decrease in the radial loading.

Optionally, the bearing shaft further comprises an inner surface, the inner surface having a facetted profile.

In one arrangement, the inner surface of the bearing shaft has a multi-facetted circumferential profile. In other words, the circumference is formed from a plurality of straight lines. When extended along the axial length of the bearing shaft, these straight lines define flat surfaces.

In another arrangement, the inner surface of the bearing shaft has a convoluted circumferential profile.

Optionally, the pre-determined circumferential variation in wall thickness is symmetrical across a plane extending through a longitudinal axis of the bearing shaft.

A bearing shaft having a circumferential variation in wall thickness, in which the circumferential variation is symmetrical across a longitudinal axis of the shaft may be easier and cheaper to manufacture than a bearing shaft having an asymmetric circumferential variation in wall thickness.

According to a second aspect of the present disclosure there is provided an epicyclic gear train comprising:
- a sun gear;
- one or more planet gears, mounted on a carrier; and
- a ring gear, wherein each of the one or more planet gears is meshingly engaged with the sun gear, each of the one or more planet gears is meshingly engaged with the ring gear, and each of the one or more planet gears is supported on a bearing shaft according to the first aspect.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure.

DETAILED DESCRIPTION

Figure 2:
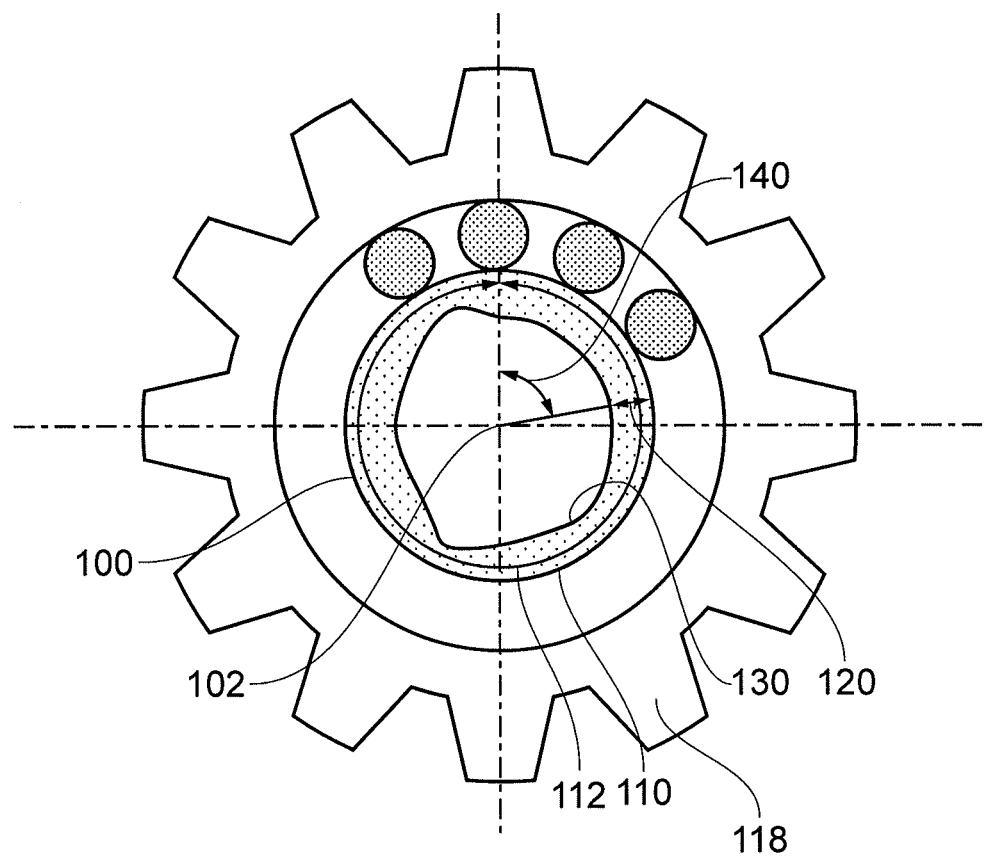
FIG. 2 shows a schematic sectional view of a bearing shaft according to a first embodiment of the disclosure and accommodated within a planet gear assembly.

Referring to FIG. 2, a bearing shaft for a planet gear of an epicyclic gear train according to a first embodiment of the disclosure is designated generally by the reference numeral 100.

Figure 1:
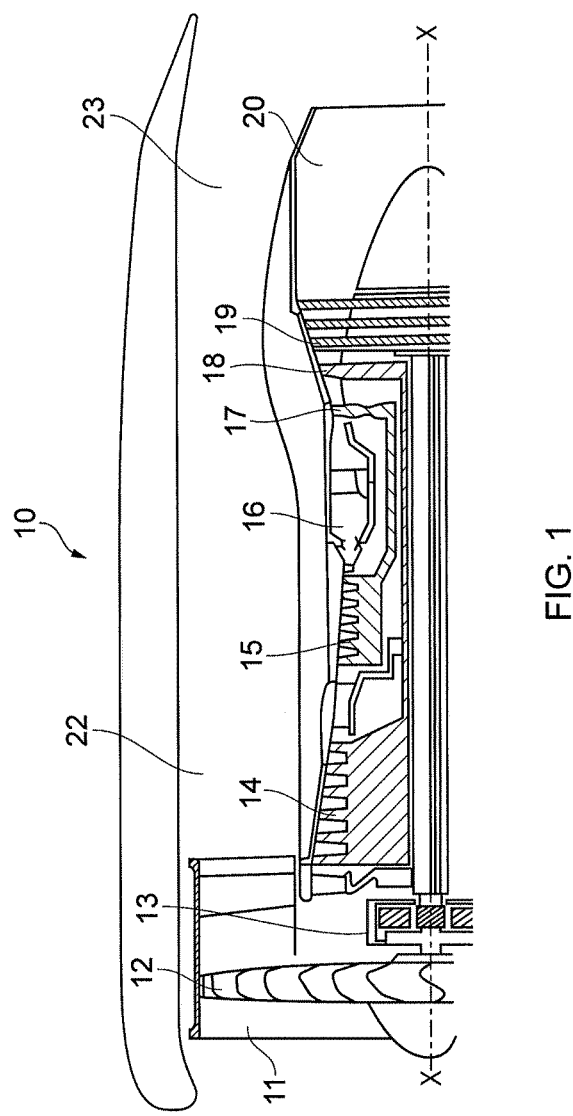
FIG. 1 shows a schematic sectional view of a ducted fan gas turbine engine.

In the present disclosure, the epicyclic gear train forms part of the power gearbox 13 illustrated in FIG. 1, and is interposed between the fan 12 and the low pressure turbine 19 of the turbofan engine 10.

The bearing shaft 100 comprises a cylindrical outer surface 110, and a wall thickness 120. As outlined above, the outer surface 110 of the bearing shaft 100 accommodates a planet gear 118.

The wall thickness 120 of the bearing shaft 100 varies circumferentially around a diameter 112 of the bearing shaft 100 so as to produce a pre-determined circumferential variation in the wall thickness 120.

In other words, the wall thickness 120 of the bearing shaft 100 at any angular position 140 around the circumference of the bearing shaft 100 varies in a pre-determined manner.

Figure 3:
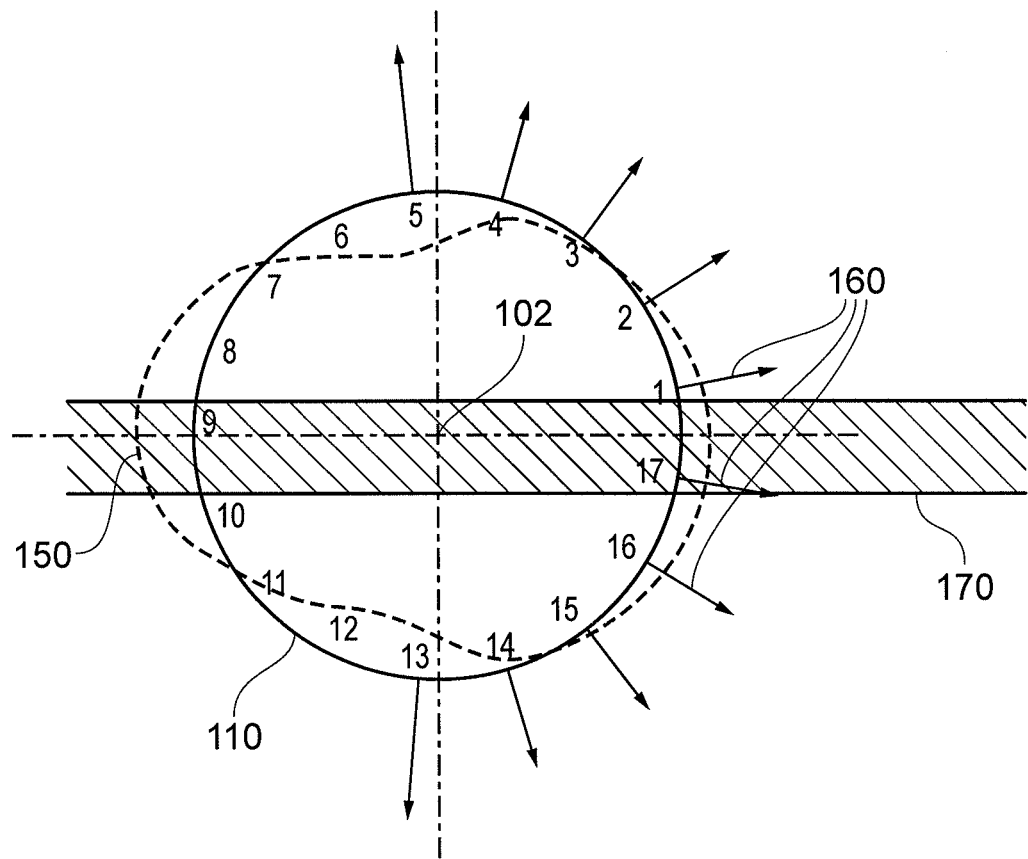
FIG. 3 shows a schematic plot of the loading experienced by the planet gear assembly of FIG. 2.

FIG. 3 illustrates a typical variation in the radial distortion experienced by a planet gear 118 resulting from the meshing engagement of the planet gear 118 with the corresponding sun gear and ring gear (both not shown) of an epicyclic gear train (also not shown, but corresponding to the power gearbox 13 of FIG. 1.

As outlined above, this radial distortion 150 causes a corresponding increase in stress in both the planet gear 118 and the bearing of the planet gear 118.

It is a straightforward exercise to determine analytically the circumferential variation in the radial distortion 150 and corresponding stress.

This circumferential variation 150 is then mapped to the circumference of the bearing shaft 100 and a conventional stress analysis technique used to determine, for each point around the circumference of the bearing shaft 100) the required wall thickness 120 that will result in an increased deflection of the bearing shaft 100 at those points where the radial load exceeds a pre-determined value.

In the bearing shaft of the present disclosure, the inner surface 130 of the bearing shaft 100 has a convoluted circumferential profile. This can be produced by a broaching technique when the bearing shaft 100 is finish machined. Alternatively, the bearing shaft may be produce by an additive layer technique.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A hollow cylindrical rotary bearing shaft for a planet gear of an epicyclic gear train, the bearing shaft comprising:
   a cylindrical outer surface accommodating the planet gear; and
   a wall thickness,
wherein the wall thickness varies circumferentially around a diameter of the bearing shaft so as to produce a pre-determined circumferential variation in wall thickness.

2. The bearing shaft as claimed in claim 1, wherein the pre-determined circumferential variation in wall thickness extends linearly along an axial length of the bearing shaft.

3. the bearing shaft as claimed in claim 1, wherein the pre-determined circumferential variation in wall thickness is determined in dependence upon a circumferential variation in a radial loading experienced by the planet gear.

4. the bearing shaft as claimed in claim 1, wherein the bearing shaft further comprises an inner surface, the inner surface having a facetted profile.

5. The bearing shaft as claimed in claim 1, wherein the pre-determined circumferential variation in wall thickness is symmetrical across a plane extending through a longitudinal axis of the bearing shaft.

6. An epicyclic gear train comprising:
   a sun gear;
   one or more planet gears, mounted on a carrier; and
   a ring gear,
wherein each of the one or more planet gears is meshingly engaged with the sun gear, each of the one or more planet gears is meshingly engaged with the ring gear, and each of the one or more planet gears is supported on a bearing shaft as claimed in claim 1.

* * * * *